United States Patent [19]

Tsuda

[11] Patent Number: 4,502,080
[45] Date of Patent: Feb. 26, 1985

[54] OPERATION DEVICE FOR FACSIMILE

[75] Inventor: Shin Tsuda, Yokohama, Japan

[73] Assignee: Canon Kabushiki Kaisha, Tokyo, Japan

[21] Appl. No.: 399,287

[22] Filed: Jul. 19, 1982

[30] Foreign Application Priority Data

Aug. 7, 1981 [JP] Japan .................................. 56-122946

[51] Int. Cl.³ ............................................ H04M 1/00
[52] U.S. Cl. .................................... 358/256; 358/286; 358/294
[58] Field of Search ........................ 358/256, 286, 294

[56] References Cited

FOREIGN PATENT DOCUMENTS 2082013 2/1982 United Kingdom ................ 358/286

Primary Examiner—Howard W. Britton
Assistant Examiner—Edward L. Coles
Attorney, Agent, or Firm—Fitzpatrick, Cella, Harper & Scinto

[57] ABSTRACT

There is disclosed an operation device for facsimile in which an operating switch can be used commonly for the sending, receiving and copying modes of a facsimile apparatus. Also an operating switch is changed over to plural modes in response to the status of the transmitter-receiver and to the presence or absence of an original document or of a recording sheet. A display is provided to indicate the function or the mode currently performed by the operating switch.

21 Claims, 6 Drawing Figures

OPERATION DEVICE FOR FACSIMILE

BACKGROUND OF THE INVENTION

1. Field of the Invention

The present invention relates to an operating method for facsimile and a device therefor, in which the number of operating switches is reduced by the use of an operating switch capable of changing its function thereof according to the operating mode of the facsimile.

2. Description of the Prior Art

Fascimile apparatus, utilized for image transmission between distance locations, is generally composed of so-called tranceiver terminals capable of both sending and receiving images, although terminals exclusively for sending or receiving images are also found.

Such a tranceiver type facsimile usually has a copying function in addition to the image sending and receiving functions. Such a copying function allows it to utilize a facsimile terminal as a simplified copier, and is also effective for confirming the quality of the received image by copying the original image on the sending terminal prior to the image transmission.

In this manner the tranceiver type facsimile has the three functions of sending, receiving and copying, which have conventionally been selected by the operator.

More specifically, as shown in FIGS. 1 and 2, there have been provided a sending button or switch 1, a receiving button or switch 2 and a copying button or switch 3 independent for said three functions.

The facsimile terminal inspects the actuation of the buttons 1-3 through the steps ST1-ST3 of a control program shown in FIG. 2 and selects a sending mode F1, a receiving mode F2 or a copying mode F3 according to the actuated button.

As shown in FIG. 1, there are provided indicator lamps 4-6 respectively for indicating selection of the sending, receiving or copying mode.

Such conventional structure, requiring independent operating buttons for the sending, receiving and copying modes inevitably leads to a complicated and expensive control panel with a large area. Also the operator is required to select an appropriate button at the operation.

SUMMARY OF THE INVENTION

A first object of the present invention is to provide a facsimile apparatus in which the number of operating switches is reduced to simplify the operation.

A second object of the present invention is to provide a facsimile apparatus in which a single operating switch can be used for controlling the sending, receiving and copying modes.

A third object of the present invention is to provide a facsimile apparatus having plural display means for indicating the function of the operating switch.

DESCRIPTION OF THE PREFERRED EMBODIMENTS

Figure 1:
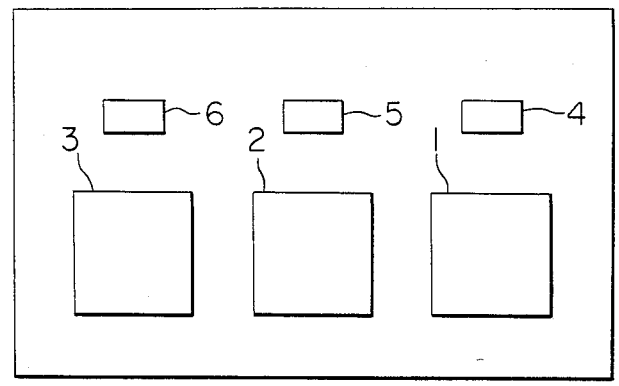
FIG. 1 is a schematic view of a control panel of a conventional facsimile apparatus.
Figure 3:
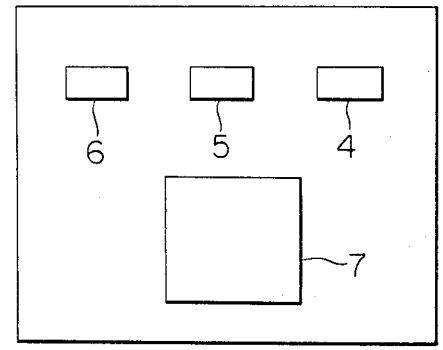
FIG. 3 is a schematic view of a control panel embodying the present invention.

FIG. 3 shows an embodiment of the present invention wherein is provided only one operating button 7 in combination with indicator lamps 4-6 respectively indicating the sending, receiving and copying modes.

Figure 4:
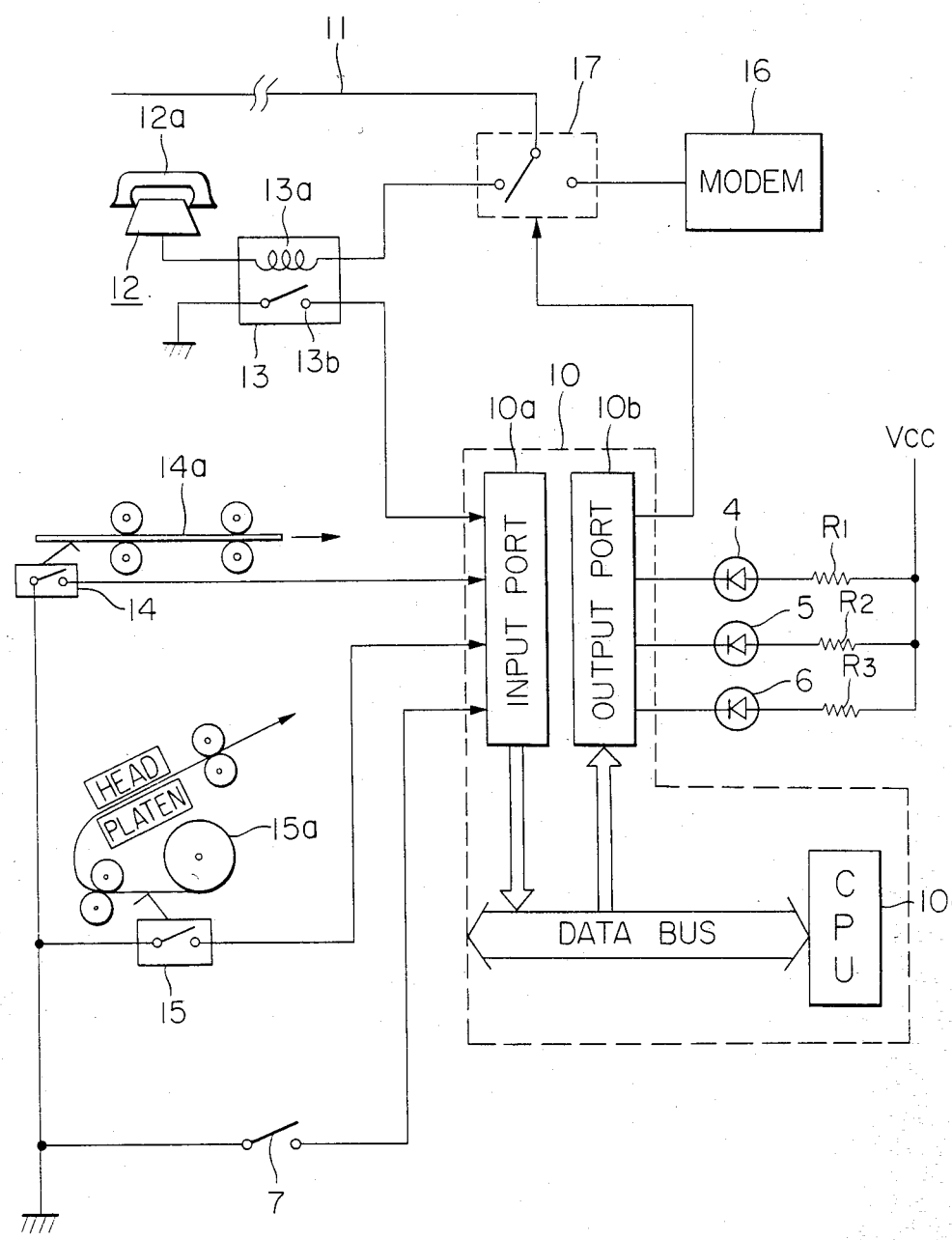
FIG. 4 is a block diagram of a control circuit embodying the present invention.

FIG. 4 is a block diagram of a facsimile apparatus of the present invention, showing only the parts necessary for the explanation of the operating unit.

In FIG. 4, a telephone line 11 is connected to a telephone set 12 through a switch 17 and a relay 13. Said relay 13 detects if handset 12a is lifted from the telephone set 12. When the handset 12a is lifted, a hook of the telephone set is elevated to close a circuit therein, thereby supplying a current from a switchboard connected to the telephone line 11. Consequently a coil 13a of the relay 13 is energized to close a contact 13b, thus identifying the hung on state of the handset 12a and, accordingly, the state of apparatus in transmission. An original detector 14 mechanically or optically detects the presence or absence of an original document.

Also a recording sheet detector 15 detects, mechanically or optically, the presence or absence of a recording sheet. A controller 10, generally composed of a microcomputer having input ports 10a, output ports 10b, CPU 10c etc., is capable of identifying the sending, receiving or copying mode in response to the detection of said relay 13, original detector 14, recording sheet detector 15 and of whether the operating button has been actuated.

A modem 16 is connected to the telephone line 11 through the relay switch 17 for selecting either the modem 16 or the telephone set 12.

Figure 5:
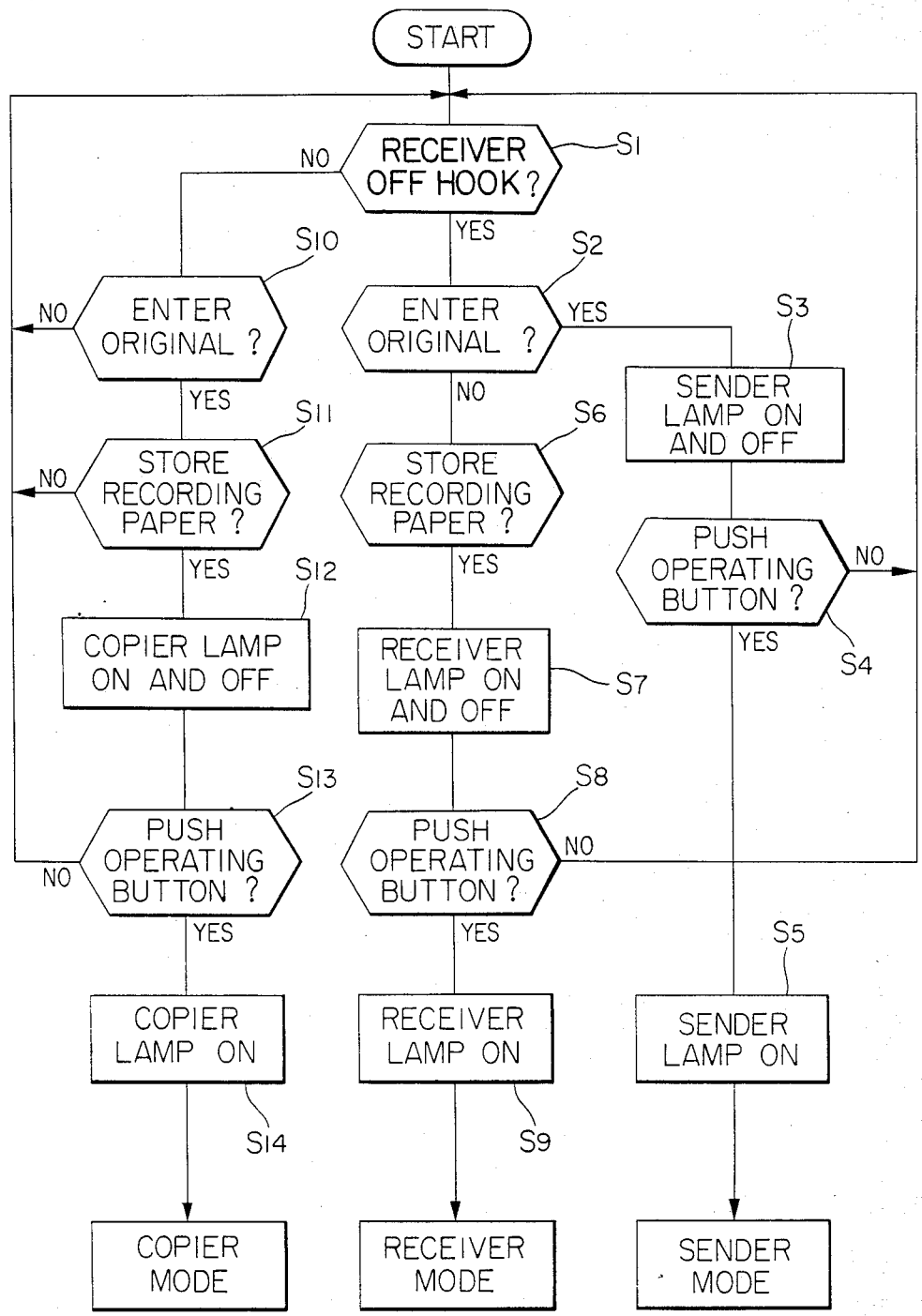
FIG. 5 is a flow chart showing the function of said circuit.

Now the function of the above-mentioned embodiment will be explained in the following, in relation to the flow chart shown in FIG. 5.

In case of sending the image of an original through the facsimile apparatus, the apparatus is started after the original is mounted at a determined position of the apparatus. Then the receiving terminal is called by dialling the telephone set after the handset 12a is lifted. After the step S1 identifies that the handset has been lifted, the step S2 is executed to identify if the original is mounted, and, if so, the controller 10 identifies the sending mode and activates the sending indicator lamp 4 in blinking manner in the step S3, whereby the operator confirms that the apparatus is ready for the sending mode.

A response from the receiving terminal can be confirmed in the step S4 by actuating the operating button or switch 7. In the step S5 the sending indicator lamp 4 is changed from the intermittent lighting to continuous lighting, thus indicating the start of the sending mode.

In case of image receiving, the step S1 identifies that the handset or receiver 12a has been lifted from the hook when the operator calls or is called by the local terminal. The step S2 identifies the absence of the original, as the original mounting is not required in the receiving mode. Then the step S6 identifies if the recording sheet is mounted, and, if so, the step S7 is executed to intermittently energize the receiving indicator lamp, thereby enabling the operator to confirm that the apparatus is ready for the receiving mode. Upon actuation of the operating button 7 by the operator, the setp S8 detects said actuation and changes the receiving indicator lamp 5 from the intermittent lighting to continuous lighting, and the operation of the receiving mode is started in the step S9.

In case of simply copying the original, the step S1 identifies that the handset 12a has not been lifted since it is not necessary to call the local terminal. Then the step S10 is executed to identify if the original is mounted, and, if so, the step S11 is executed to identify if the recording sheet is mounted. If the presence of the recording sheet is confirmed, the step S12 intermittently energizes the copying indicator lamp 6, thus enabling the operator to confirm that the apparatus is ready for the copying mode. Upon actuation of the button 7 by the operator, the step S13 identifies said actuation and changes the copying indicator lamp from intermittent lighting to continuous lighting, whereby the operation of the copying mode is initiated.

The above-explained procedures are summarized in Tab. 1.

TABEL 1

| Hand-set | Origi-nal | Re-cord-ing sheet | Indicator lamps | | Opera-tion |
|---|---|---|---|---|---|
| | | | Before actuation of opera-ting button | After actuation of opera-ting button | |
| 0 | 0 | X | — | — | None |
| 0 | 1 | 1 | Copying lamp flashes | Copying lamp is lighted | Copying |
| 1 | 0 | 1 | Receiving lamp flashes | Receiving lamp is lighted | Receiv-ing |
| 1 | 1 | X | Sending lamp flashes | Sending lamp is lighted | Sending |

In Tab. 1, "0" indicates the hung-up state of the telephone handset or the absence of original of recording sheet, while "1" indicates the hung on state of the telephone handset or the presence of original or recording sheet. "X" indicates that either "1" or "0" is acceptable.

Figure 6:
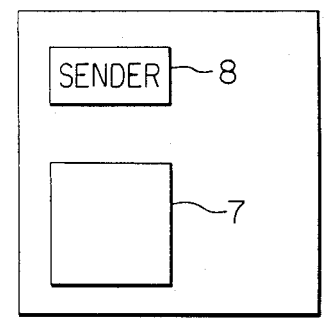
FIG. 6 is a schematic view showing another embodiment of the present invention.
Figure 2:
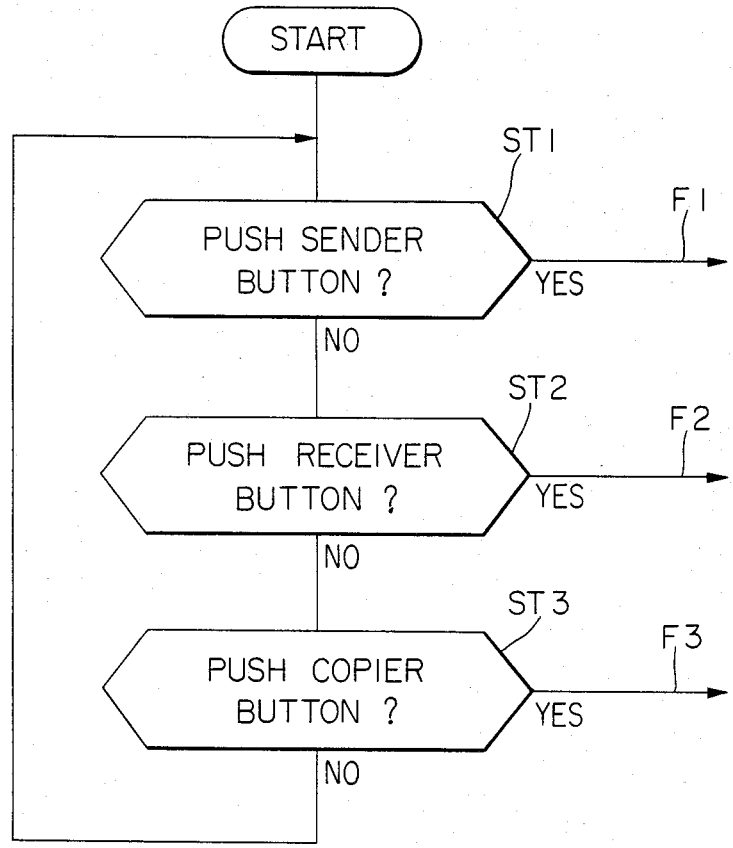
FIG. 2 is a flow chart showing the function of a conventional facsimile apparatus.

In the foregoing embodiment independent indicator lamps 4, 5, 6 are utilized for indicating the sending, receiving and copying modes, but such lamps may be replaced by a single indicator tube 8 capable, as shown in FIG. 6, of displaying numerals, symbols etc. so that the various modes can be displayed by a display means.

Also in each mode the actuation of the operating button 7 is identified by the change of the indicator lamp from the flashing state to the continuous lighting state, but such identification can also be achieved by changing the color of the display.

As explained in detail in the foregoing, the present invention allows the operator, by means of a single operating button and at least a mode display means, to identify the sending, receiving and copying modes and stand-by state in each mode according to the status of the facsimile terminal and of, the telephone handset, and therefore enables the operator to control the facsimile terminal with only one operating button. The present invention also reduces the number of operating buttons or of display means, thereby compactizing not only the control panel but also the entire facsimile apparatus.

What I claim is:

1. An operating device for facsimile comprising:
    a single switch for causing the operation of the sending and receiving modes of facsimile;
    first detecting means for detecting the state of a telephone handset;
    second detecting means for detecting the presence or absence of an original document; and
    control for controlling the mode of said switch means according to the result of detection by said first and second detecting means.

2. An operating device for facsimile according to claim 1, wherein said control means directs said switch to the sending mode in response to a detection by said first detecting means that the telephone handset is lifted and to a detection of the presence of the original document by said second detecting means.

3. An operating device for facsimile comprising:
    a single switch for causing the operation of the sending and receiving modes of facsimile;
    first detecting means for detecting the state of a telephone handset;
    second detecting means for detecting the presence or absence of an original document;
    third detecting means for detecting the presence or absence of a recording sheet; and
    control means for controlling the mode of said switch according to the result of detection by said first, second and third detecting means.

4. An operating device for facsimile according to claim 3, wherein said control means directs said switch to the receiving mode in response to a detection by said first detecting means that the telephone handset is lifted, to a detection of the absence of the original document by said second detecting means and to a detection of the presence of the recording sheet by said third detecting means.

5. An operating device for facsimile comprising:
    a single switch for causing the operation of the sending, receiving and copying modes of facsimile;
    first detecting means for detecting the state of a telephone handset;
    second detecting means for detecting the presence or absence of an orginal document;
    third detecting means for detecting the presence or absence of a recording sheet; and
    control means for controlling the mode of said switch according to the result of detection by said first, second and third detecting means.

6. An operating device for facsimile according to claim 5, wherein said control means directs said switch to the copying mode in response to a detection by said first detecting means that the telephone handset is not lifted, to a detection of the presence of the original document by said second detecting means and to a detection of the presence of the recording sheet by said third detecting means.

7. An operating device for facsimile comprising
    a single switch for causing the operation of the sending and receiving modes of facsimile;
    display means for displaying the state of mode of said switch
    first detecting means for detecting the state of a telephone handset;
    second detecting means for detecting the presence or absence of an original document; and
    control means for controlling the mode of said switch and said display means according to the result of detection by said first and second detecting means.

8. An operating device for facsimile according to claim 7, wherein said control means directs said switch and said display means to the sending mode in response to a detection by said first detecting means that the telephone handset is lifted and to a detection of the presence of the original document by said second detecting means.

9. An operating device for facsimile comprising:
a single switch for causing the operation of the sending and receiving modes of facsimile;
display means for displaying the state of mode of said switch;
first detecting means for detecting the state of a telephone handset;
second detecting means for detecting the presence or absence of an original document;
third detecting means for detecting the presence or absence of a recording sheet; and
control means for controlling the mode of said switch and said display means according to the result of detection by said first, second and third detecting means.

10. An operating device for facsimile according to claim 9, wherein said control means directs said switch and said display means to the receiving mode in response to a detection by said first detecting means that the telephone handset is lifted, to a detection of the absence of the original document by said second detecting means and to a detection of the presence of the recording sheet by said third detecting means.

11. An operating device for facsimile comprising:
a single switch for causing the operation of the sending, receiving and copying modes of facsimile;
display means for displaying the state of mode of said switch;
first detecting means for detcting the state of a telephone handset;
second detecting means for detecting the presence or absence of an original document;
third detecting means for detecting the presence or absence of a recording sheet; and
control means for controlling the mode of said switch and said display means according to the result of detection by said first, second and third detecting means.

12. An operating device for facsimile according to claim 11, wherein said control means directs said switch and said display means to the copying mode in response to a detection by said first detecting means that the telephone handset is not lifted, to a detection of the presence of the original document by said second detecting means and to a detection of the presence of the recording sheet by said third detecting means.

13. An operating device for facsimile comprising:
a single switch for causing the operation of the sending, receiving and copying modes of facsimile;
display means for displaying the state of mode of said switch and
control means for causing said display means to display the mode before and after the start of said operation by said switch, wherein the form of display by said display means is rendered different before and after said start of operation.

14. An operating device for facsimile according to claim 13, wherein said control means causes said display means to display the different states in each mode by flashing and continuous lighting or by different colors.

15. An operating device for facsimile according to claim 13 or 14, wherein said display means comprises plural display members respectively corresponding to the sending, receiving and copying modes of facsimile.

16. An operating device for facsimile according to claim 13 or 14, wherein said display means comprises a display member capable of displaying characters and/or patterns and/or symbols for identifying the sending, receiving and copying modes of facsimile.

17. An operating device for facsimile comprising:
first detection means for detecting the hook condition of a telephone handset;
second detection means for detecting the presence of an original document;
control means for producing different mode control signals on the basis of the detection results of said first and second detection means; and
a single switch for causing said control means to produce a transmission mode control signal when said first detection means detects the off-hook condition of the telephone handset and said second detection means detects the presence of an original document, wherein said switch otherwise causes said control means to produce a reception mode control signal or copy mode control signal.

18. An operating device for facsimile comprising:
first detection means for detecting the hook condition of a telephone handset;
second detection means for detecting the presence of an original document;
third detection means for detecting the presence of a recording sheet;
control means for producing different mode control signals on the basis of the detection results of said first, second and third detection means;
a single switch which, in response to detection results by said first and second means, causes said control means to produce a transmission mode control signal and in response to detection results by said first, second and third detection means causes said control means to produce a reception mode or copy mode control signal.

19. An operating device according to claim 18, wherein said single switch causes said control means to produce the transmission mode control signal when said first detection means detects the off-hook condition of the telephone handset and said second detection means detects the presence of the original document, no matter which condition is detected by said third detection means.

20. An operating device according to claim 18, wherein said single switch causes said control means to produce the reception mode control signal when said first detection means detects the offhook condition of the telephone handset, said second detection means does not detect the presence of an original document and said third detection means detects the presence of a recording sheet.

21. An operating device according to claim 18, wherein said single switch causes said control means to produce the copy mode control signal when said first detection means detects the on-hook condition of the telephone handset, said second detection means detects the presence of an original document and also said third detection means detects the presence of a recording sheet.

* * * * *

UNITED STATES PATENT AND TRADEMARK OFFICE
CERTIFICATE OF CORRECTION

PATENT NO. : 4,502,080
DATED : February 26, 1985
INVENTOR(S) : SHIN TSUDA

It is certified that error appears in the above-identified patent and that said Letters Patent is hereby corrected as shown below:

Column 1, line 10, "thereof" should be deleted.

Column 2, line 23, "hung-on" should be --lifted--.

Column 3, line 21, "Tabel 1" should be --Tab. 1--.

line 38, "hung-on" should be --lifted--.

Column 4, line 3, after "control", --means-- should be inserted, and "switch means" should be changed to --switch--.

line 56, after "switch" should be inserted --;--.

Signed and Sealed this

Eighth Day of October 1985

[SEAL]

Attest:

DONALD J. QUIGG

Attesting Officer

Commissioner of Patents and
Trademarks—Designate